May 22, 1956  D. B. ROY  2,746,622
TRAILER FOR TRANSPORTING A BOAT
Filed March 30, 1953  2 Sheets-Sheet 1
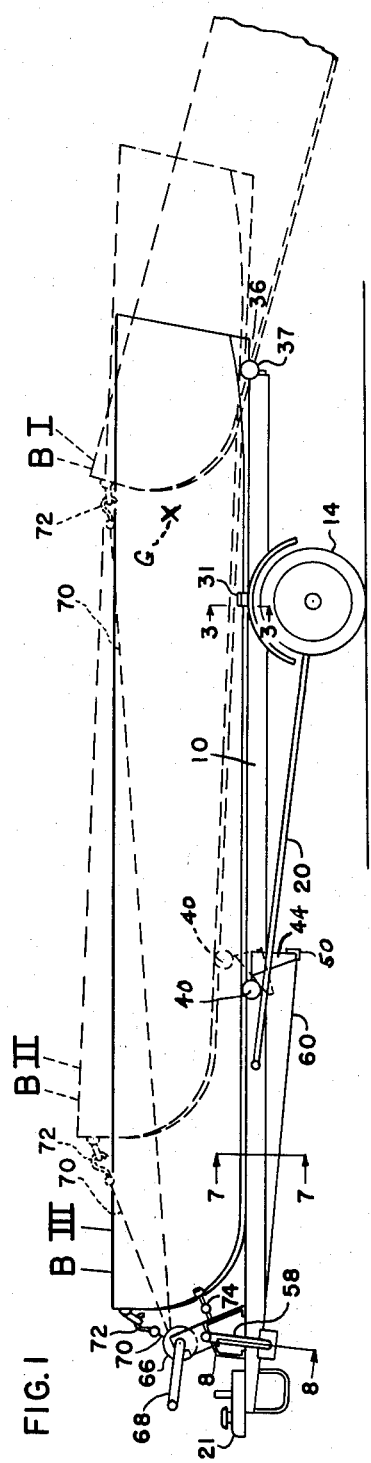
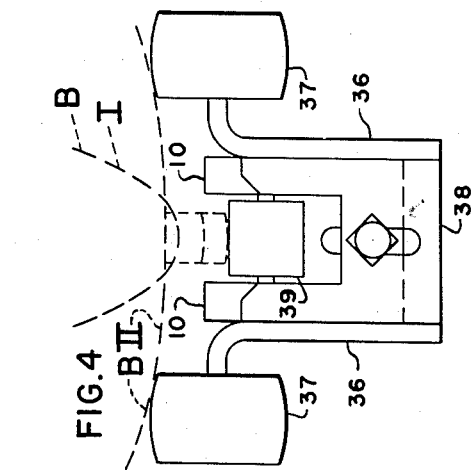
FIG. 4
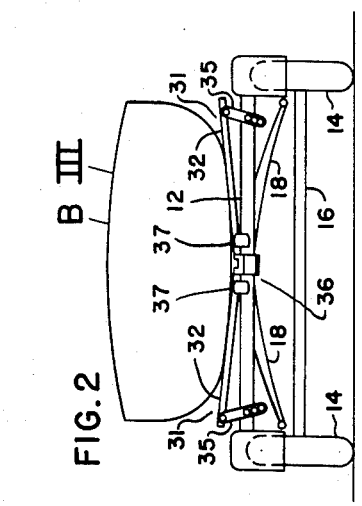
FIG. 2
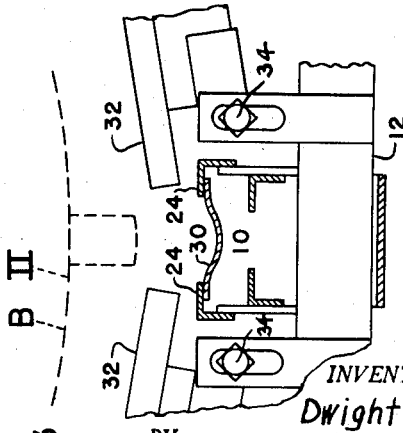
FIG. 3
FIG. 1
INVENTOR.
Dwight B. Roy
BY
S. Jay Teller
Attorney May 22, 1956 D. B. ROY 2,746,622
TRAILER FOR TRANSPORTING A BOAT
Filed March 30, 1953 2 Sheets-Sheet 2
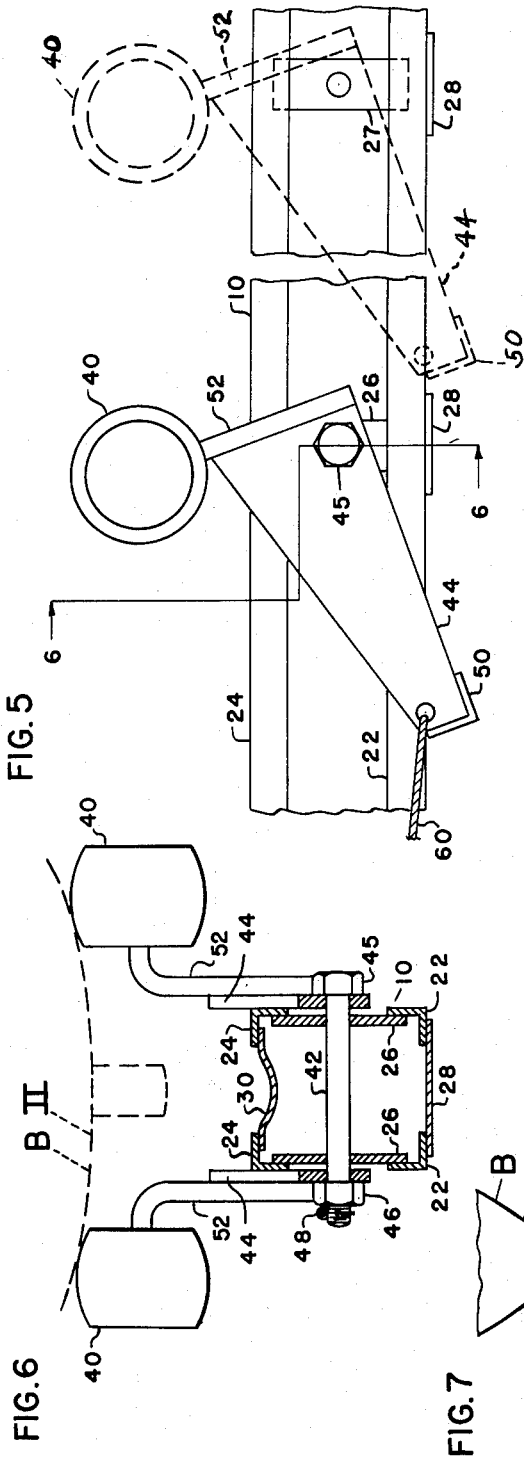
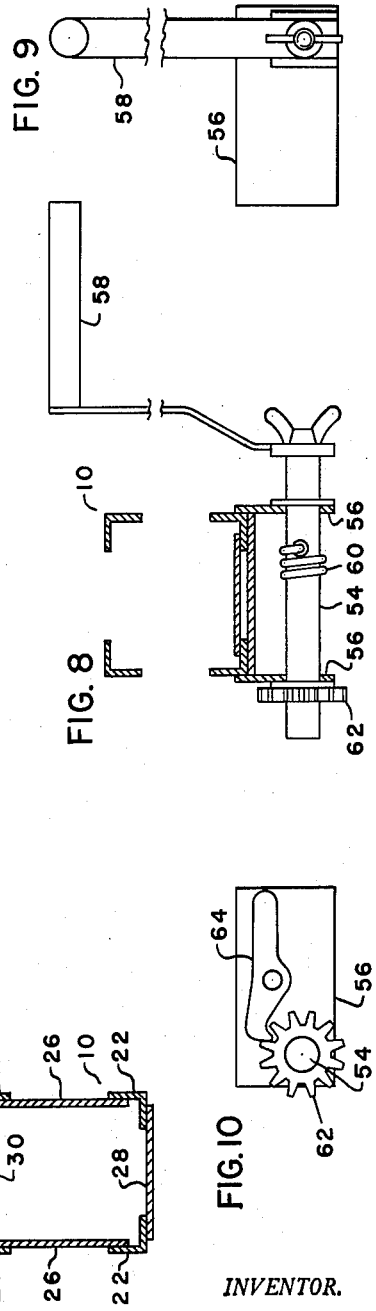
INVENTOR.
Dwight B. Roy
BY S. Jay Teller
Attorney United States Patent Office 2,746,622
Patented May 22, 1956

2,746,622

TRAILER FOR TRANSPORTING A BOAT

Dwight B. Roy, Rocky Hill, Conn., assignor to Mastercraft Trailers, Inc., Middletown, Conn., a corporation of Connecticut Application March 30, 1953, Serial No. 345,300

6 Claims. (Cl. 214—84)

This invention relates to a trailer for transporting a boat, the trailer having ground engaging supporting wheels near the rear and having means near the front for connection with a suitable supporting and traction means which may be an attachment on the rear of an automobile.

The general object of the invention is to provide improved means for facilitating the loading of a boat onto a trailer or the unloading of a boat therefrom. A more specific object of the invention is to provide a trailer having an improved roller construction for supporting and guiding a boat during loading and unloading, the said roller construction being in part movable so as to enable the boat when fully loaded to be supported independently of the roller construction.

Another more specific object of the invention is to provide advantageous mechanism for supporting and moving relatively movable boat supporting rollers.

Still other specific objects of the invention will be apparent from the drawings and from the following description.

In the drawings I have shown in detail a preferred embodiment of the invention, but it will be understood that various changes may be made from the construction shown, and that the drawings are not to be construed as defining or limiting the scope of the invention, the claims forming a part of this specification being relied upon for that purpose.

Of the drawings:

Fig. 1 is a side view of a boat trailer embodying the invention, a boat being shown in three successive positions designated respectively as I, II and III.

Fig. 2 is a rear view of the boat trailer, a boat being shown in its final loaded position which is position III of Fig. 1.

Fig. 3 is an enlarged fragmentary transverse sectional view taken along the line 3—3 of Fig. 1.

Fig. 4 is an enlarged fragmentary rear view similar to a portion of Fig. 2.

Fig. 5 is an enlarged fragmentary side view similar to a portion of Fig. 1, but showing the parts in the positions indicated by dotted lines in the said Fig. 1.

Fig. 6 is a transverse sectional view taken along the line 6—6 of Fig. 5.

Fig. 7 is an enlarged fragmentary transverse sectional view taken along the line 7—7 of Fig. 1.

Fig. 8 is an enlarged fragmentary transverse sectional view taken along the line 8—8 of Fig. 1.

Fig. 9 is a left side view of some of the parts shown in Fig. 8, this view being taken from the right in respect to the said Fig. 8.

Fig. 10 is a right side view of some of the parts shown in Fig. 8, this view being taken from the left in respect to the said Fig. 8.

As shown in the drawings, the boat trailer comprises a main frame which includes a longitudinal central boom 10. The boom is preferably at least as long as the longest boat that the trailer is intended to carry. The frame also includes a transverse member 12 rigidly connected at the center thereof with the boom 10, the said member 12 being between the ends of the boom and preferably behind the longitudinal center thereof. Ground engaging supporting wheels 14, 14 are provided on an axle 16 which is preferably below the member 12. The axle is connected with the frame by means of a conventional spring 18. Diagonal tie rods 20 connect the axle with the forward portion of the boom. At the forward end of the boom 10 there is provided a part of a conventional towing hitch 21 which is connectible with a mating part on the rear of an automobile.

The boom 10 may be widely varied as to details, but as shown it comprises lower longitudinal angle bars 22, 22 and upper longitudinal angle bars 24, 24. The bars 22 and 24 at each side are connected at intervals throughout their length by similar longitudinally spaced upright members, two of which members are shown in Fig. 5 at 26 and 27. The bars 22 and 24 at each side may be also connected by diagonal braces that are not shown. The lower bars 22, 22 are connected at intervals throughout their length by similar longitudinally spaced plates 28, 28 and the upper bars 24, 24 are connected at intervals throughout their length by similar longitudinally spaced plates 30, 30, one of which is shown in Fig. 6 and another in Fig. 7. Each plate 30 is preferably bent to form a concave face which is upwardly exposed for engaging the bottom of the keel of a boat B.

A boat steadying or supporting cradle 31 is carried by the main frame, this cradle being adapted to engage the bottom of the boat B at transversely spaced locations so as to hold the boat in a fixed position with respect to the frame. As shown, the cradle comprises two upwardly exposed boat engaging bars 32, 32. These bars are preferably adjustable in accordance with the shape of the bottom of the boat. The inner ends of the bars 32, 32 are vertically adjustable by means of slot and bolt connections 34, 34 as shown in Fig. 3. The outer ends of the bars 32, 32 are supported by links 35, 35, and are vertically adjustable by means of spaced holes in the said links, the said holes being adapted to receive bolts extending into holes in the transverse member 12. Preferably and as shown, the cradle is directly above the frame member 12.

Carried by the boom 10 at the rear thereof is a boat supporting device 36 which includes at least one boat supporting roller rotatable about a normally fixed transverse axis. Preferably the said boat supporting device includes two rollers 37, 37 which are rotatable about normally fixed transverse axes and which are transversely spaced for engagement with the bottom of the boat B at opposite sides of the keel thereof. The rollers 37, 37 are preferably convex in planes through their axes so as to be adapted to properly engage the bottoms of differently shaped boats. Preferably the rollers 37, 37 are vertically adjustable in unison, and as shown they are carried by a plate 38 which is vertically adjustable, the plate being held in adjusted position by a bolt extending through a vertical slot. An additional roller 39 is preferably provided which is also rotatable about a normally fixed transverse axis and which is between the rollers 37, 37. The roller 39 is adapted to engage the keel of the boat.

As hereinafter explained, the boat B during loading is initially in the position I wherein it is chiefly at the rear of the boom and is downwardly and rearwardly inclined, and it is thereafter moved to the position II wherein it is substantially horizontal. During unloading the procedure is reversed. The rollers 37, 37 and 39 are so located that they are exposed for engagement with the bottom of the boat in either of the last said positions thereof. With the boat in the position I, the keel engages with and is supported by the roller 39 as shown in Fig. 4, the body of the boat by reason of its narrower shape at the front being out of engagement with the rollers 37, 37. When the boat is moved to an intermediate position and then to the position II, the body of the boat engages with and is supported by the rollers 37, 37, the keel then being out of engagement with the roller 39.

In adapting the trailer for carrying a particular boat, the boat is located in its fully forward position with its keel engaging the several supporting plates 30, 30 along the boom. The bars 32, 32 of the cradle are adjusted to engage the bottom of the boat to steady it and prevent any transverse pivotal or rocking movement with respect to the frame. The rear rollers 37, 37 are vertically adjusted so that they are very close to the bottom of the rear portion of the boat, as shown in Fig. 2, but nevertheless out of engagement therewith.

Carried by the boom 10 at positions substantially ahead of the cradle 31 are two transversely spaced rollers 40, 40 adapted to engage the bottom of the boat B at positions at opposite sides of the keel. Preferably the rollers are convex in planes through their axes so as to be adapted to properly engage the bottoms of differently shaped boats. The rollers 40, 40 are so connected with the boom that they are movable relatively thereto to upper positions or lower positions. The means for connecting and relatively moving the rollers 40, 40 may be widely varied, but they are preferably movable about a transverse pivotal axis to their said upper and lower positions.

As shown, there is a transverse pivot bolt or pivot element 42 which is shown as extending through apertures in the boom uprights 26, 26. Mounted on the bolt or shaft 42 at opposite sides of the boom are two similar plates 44, 44. The plates 44, 44 are held in place by a head 45 on the bolt and by a nut 46 thereon, a cotter pin 48 being preferably provided to hold the nut. The lower forward portions of the plates 44, 44 are connected by a transverse angle bar 50. The angle bar 50 serves to insure movement of the two plates in unison, and it also serves by engagement with the bottom of the boom to limit pivotal movement in the clockwise direction. Two similar rods 52, 52 are secured to the plates 44, 44 by welding or otherwise and the upper portions of the said rods are bent outwardly to provide pivotal supports for the rollers 40, 40. The plates 44, 44 and the rods 52, 52 collectively constitute roller supporting arms. It will be observed that the plates 44, 44, the bar 50 and the rods 52, 52 are all pivotally movable in unison about the axis of the pivot element 42, thus constituting a pivotally movable means for supporting and moving the rollers 40, 40. The rollers are movable to upper positions as shown in Figs. 5 and 6 and as shown by dotted lines in Fig. 1, and they are movable to lower positions as shown by full lines in Fig. 1.

The longitudinal spacing between the rollers 40, 40 and the rear supporting device 36 is very important. This spacing is such that the rollers 40, 40, when in their upper positions, are engageable with the boat near the front end thereof when the boat is in a position wherein its center of gravity is slightly ahead of the rear supporting device 36. Referring to Fig. 1, it will be seen that with the boat in the intermediate position II the center of gravity G is considerably ahead of the supporting device 36. However, when the front portion of the boat first engages the rollers 40, 40, the center of gravity G is at or only slightly ahead of the supporting device 36. The center of gravity is ordinarily behind the longitudinal center of the boat. Therefore, the longitudinal spacing between the rollers 40, 40 and the supporting device 36 is ordinarily greater than one-half of the length of the boat.

In order that the trailer may be adapted for boats of different lengths, the rollers 40, 40 and the supporting means therefor may be in any one of at least two longitudinally spaced locations. As shown in Fig. 5 the said roller supporting means is carried by the uprights 26, but by withdrawing the bolt or pivot element 42 the said means may be moved so as to be carried by the uprights 27. When carried by the uprights 27, the rollers 40, 40 and the supporting means therefor are located further toward the rear. When the rollers are further toward the rear, they are engageable with a shorter boat near the front end thereof when the said shorter boat first reaches a position wherein its center of gravity is slightly ahead of the rear supporting device 36.

Mechanism is provided for causing the roller supporting means to move in either direction so as to move the rollers 40, 40 either to their upper positions or to their lower positions. This mechanism is preferably so constructed and arranged that movement of the rollers can be manually effected from a position at or near the front of the main frame. As shown, a transverse shaft 54 is rotatably supported in plates 56, 56 secured to the boom near the front end thereof. A crank 58 is connected to the shaft 54 at one end thereof for rotating it. A cable or rope 60 is connected at its rear end to one of the plates 44 and is connected at its front end for winding on the shaft 54, the said shaft thus serving as a winding drum. When the crank 58 is turned in one direction the rope 60 is wound on the shaft 54 and the roller supporting means is moved in the clockwise direction to move the rollers 40, 40 from their lower positions as shown by full lines in Fig. 1 to their upper positions as shown by dotted lines in Fig. 1 and as shown in Figs. 5 and 6. The described movement is limited by the engagement of the bar 50 with the bottom of the boom. When the crank 58 is turned or is permitted to turn in the opposite direction, the roller supporting means is released for movement by gravity so that the rollers are moved to their lower positions as shown by full lines in Fig. 1.

For holding the rollers 40, 40 in their upper positions a ratchet wheel 62 is secured to the shaft and a pawl 64 is pivotally mounted on the adjacent plate 56. The pawl 64 is engageable with the ratchet wheel 62 to prevent rotation of the shaft 54 in the unwinding direction to thus hold the rollers 40, 40 in their upper positions. When the rollers 40, 40 are to be moved to their lower positions, the pawl 64 is disengaged from the ratchet wheel 62.

For moving the boat in the forward direction a rotatable drum 66 may be provided on the boom 10, preferably above the shaft 54, and a crank 68 may be provided for rotating the drum. A cable or rope 70 is connected with the drum 66 for winding thereon, the rope having a hook 72 for engagement with an eye on the front of the boat. A yoke 74 is preferably provided for engaging the boat to limit forward movement thereof.

When a boat is to loaded, the rollers 40, 40 are moved to their upper positions as shown by dotted lines in Fig. 1. The boat B is first placed in the position I as shown in Fig. 1, the front of the boat being supported first by the roller 39 and then by the rollers 37, 37 of the rear supporting device 36. Then the hook 72 on the rope 70 is connected to the boat and the drum 66 is rotated to draw the boat forwardly first over the roller 39 and then over the rollers 37, 37. The center of gravity of the boat is initially at the rear of the last said rollers and the boat therefore does not tilt forwardly or downwardly and it does not engage the cradle 31. As forward movement is continued, a position at the rear of position II is reached wherein the center of gravity G is slightly forward of the supporting device 36, and thereupon the boat tilts downwardly so that the forward portion moves into engagement with the rollers 40, 40. The upper position of the said last rollers is such that the boat B is held out of engagement with the cradle 31, the front rollers 40, 40 and the rollers 37, 37 of the rear supporting device 36 constituting the sole supporting means. As forward movement is further continued the boat B reaches a position wherein its forward end is directly above the position III. Then the pawl 64 is disengaged to permit the rollers 40, 40 to move to their lower positions. Preferably the crank 58 is manually engaged so that the rollers are lowered relatively slowly. As the rollers move to their lower positions, the boat tilts downwardly to the position III. As the boat moves to the said position III, it moves pivotally about the rollers 37, 37 of the rear supporting device 36 until its keel engages the supporting plates 30, 30 on the boom and until its keel engages the supporting plates 30, 30 on the boom and until its body engages the bars 32, 32 of the cradle 31. When the rear portion of the keel engages the rear supporting plate 30, there is a pivotal movement about the said plate so that the rear portion of the bottom of the boat is disengaged from the rear rollers 37, 37. In the position III the boat is supported independently of any of the rollers, being supported entirely by the boom 10 and by the cradle 31. Straps, not shown, may be provided for more securely positioning the boat on the main frame and on the cradle.

As has been stated, it is important that the front portion of the boat be far enough forward to be above the rollers 40, 40 when the center of gravity G first passes the rear supporting device 36. To provide for this condition when the boat is shorter than that shown, it may be necessary to move the rollers 40, 40 to a longitudinally different location, as for instance by transferring them to the uprights 27.

When a boat is to be unloaded, the rollers 40, 40 are moved to their before-described upper positions by turning the crank 58. This tilts the boat upwardly so that it is disengaged from the boom 10 and from the cradle 31. The boat is then entirely supported by the front rollers 40, 40 and by the rollers 37, 37 of the rear supporting device 36. Thereupon the boat can be moved rearwardly, the movements being the reverse of those previously described.

The invention claimed is:

1. In a trailer for transporting a boat, the combination of a main frame and a cradle thereon near the rear end thereof for supporting a boat in a fully loaded forward position, ground engaging supporting wheels for the main frame behind the forward end thereof, a boat supporting device on the main frame at the rear end thereof and behind the cradle and including at least one boat supporting roller rotatable about a normally fixed transverse axis, two transversely spaced forward boat supporting rollers on the main frame ahead of the cradle and so spaced from the rear supporting device as to be engageable with the boat near the front thereof when the boat is positioned with its center of gravity slightly ahead of the rear supporting device, and means for causing movement of the two said forward rollers in unison relatively to the main frame and independently of the rear supporting device to upper positions or to lower positions, the said forward rollers when in their upper positions being at such an elevation that they and the said rear supporting device constitute the sole means for supporting the boat above the cradle for longitudinal movement to its fully forward position during loading and the said forward rollers upon subsequent movement from their upper positions to their lower positions serving to release the boat for downward pivotal movement about the said rear supporting device so that the boat after such pivotal movement is freed from engagement with the rear supporting device and with the forward rollers and is entirely supported by the said main frame and the said cradle.

2. In a trailer for transporting a boat, the combination of a main frame and a cradle thereon near the rear end thereof for supporting a boat in a fully loaded forward position, ground engaging supporting wheels for the main frame behind the forward end thereof, a boat supporting device on the main frame at the rear end thereof and behind the cradle and including at least one boat supporting roller rotatable about a normally fixed transverse axis, two transversely spaced forward boat supporting rollers on the main frame ahead of the cradle and spaced from the rear supporting device by a distance greater than one-half of the length of the boat, and means for causing movement of the two said forward rollers in unison relatively to the main frame and independently of the rear supporting device to upper positions or to lower positions, the said forward rollers when in their upper positions being at such an elevation that they and the said rear supporting device constitute the sole means for supporting the boat above the cradle for longitudinal movement to its fully forward position during loading and the said forward rollers upon subsequent movement from their upper positions to their lower positions serving to release the boat for downward pivotal movement about the said rear supporting device so that the boat after such pivotal movement is freed from engagement with the rear supporting device and with the forward rollers and is entirely supported by the said main frame and by the said cradle.

3. In a trailer for transporting a boat, the combination of a main frame and a cradle thereon near the rear end thereof for supporting a boat in a fully loaded forward position, ground engaging supporting wheels for the main frame behind the forward end thereof, a boat supporting device on the main frame at the rear end thereof and behind the cradle and including at least one boat supporting roller rotatable about a normally fixed transverse axis, means for connecting the said rear supporting device with the main frame in any of a plurality of vertically different positions so that the roller of the said device may be closely adjacent but slightly spaced from the bottom of the boat when the said boat is in the said forward position, two transversely spaced forward boat supporting rollers on the main frame ahead of the cradle and so spaced from the rear supporting device as to be engageable with the boat near the front thereof when the boat is positioned with its center of gravity slightly ahead of the rear supporting device, and means for causing movement of the two said forward rollers in unison relatively to the main frame and independently of the rear supporting device to upper positions or to lower positions, the said forward rollers when in their upper positions being at such an elevation that they and the said rear supporting device constitute the sole means for supporting the boat above the cradle for longitudinal movement to its forward position during loading and the said forward rollers upon subsequent movement from their upper positions to their lower positions serving to release the boat for downward pivotal movement about the said rear supporting device so that the boat after such pivotal movement is freed from engagement with the rear supporting device and with the forward rollers and is entirely supported by the said main frame and the said cradle.

4. In a trailer for transporting any one of a plurality of boats having different lengths, the combination of a main frame and a cradle thereon near the rear end thereof for supporting any one of the boats in a fully loaded forward position, ground engaging supporting wheels for the main frame behind the forward end thereof, a boat supporting device on the main frame at the rear end thereof and behind the cradle and including at least one boat supporting roller rotatable about a normally fixed transverse axis, two transversely spaced forward boat supporting rollers on the main frame, means for connecting the rollers with the main frame in any one of a plurality of longitudinally spaced locations ahead of the cradle, the said rollers in any of the said locations being so spaced from the rear supporting device as to be engageable with a selected boat near the front thereof when the said selected boat is positioned with its center of gravity slightly ahead of the rear supporting device, and means for causing movement of the two said forward rollers in unison relatively to the main frame and independently of the rear supporting device to upper positions or to lower positions, the said forward rollers when in their upper positions being at such an elevation that they and the said rear supporting device constitute the sole means for supporting the selected boat above the cradle for longitudinal movement to its fully forward position during loading and the said forward rollers upon subsequent movement from their upper positions to their lower positions serving to release the selected boat for downward pivotal movement initially about the said rear supporting device so that the boat after such pivotal movement is freed from engagement with the rear supporting device and with the forward rollers and is entirely supported by the said main frame and the said cradle.

5. In a trailer for transporting a boat, the combination of a main frame and a cradle for supporting a boat in a fully loaded forward position, ground engaging supporting wheels for the main frame behind the forward end thereof, a boat supporting device on the main frame at the rear end thereof and including at least one boat supporting roller rotatable about a normally fixed transverse axis, two transversely spaced forward boat supporting rollers on the main frame ahead of the cradle and so spaced from the rear supporting device as to be engageable with the boat near the front end thereof when the center of gravity of the boat is slightly ahead of the rear supporting device, and means for causing movement of the two said forward rollers in unison relatively to the main frame and independently of the rear supporting device to upper positions or to lower positions, the said means including a rotatable drum on the forward end portion of the frame and a crank for turning the drum and a rope windable upon the drum and connected with the said rollers.

6. In a trailer for transporting a boat, the combination of a main frame and a cradle thereon for supporting a boat in a fully loaded forward position, the said main frame including a narrow longitudinal boom, a transverse horizontal pivot element extending from side to side of the boom and through apertures therein ahead of the cradle, two arms supported by the pivot element at opposite sides of the boom, means connecting the arms with each other for movement in unison, two transversely spaced boat supporting rollers respectively carried by the said arms, and means manually operable from a position near the front of the main frame for causing movement of the two arms in unison about the axis of the pivot element so as to move the rollers to upper and lower positions, the said means including a rotatable drum on the forward end portion of the boom and a crank for turning the drum and a rope windable upon the drum and connected with the arms for moving them.

References Cited in the file of this patent

UNITED STATES PATENTS

| | | |
|---|---|---|
| 2,485,793 | Vassar | Oct. 25, 1949 |
| 2,496,599 | Rivers | Feb. 7, 1950 |
| 2,558,418 | Brueckman | June 26, 1951 |
| 2,586,485 | Schroeder | Feb. 19, 1952 |
| 2,608,314 | Krider | Aug. 26, 1952 |
| 2,636,745 | Cartwright | Apr. 28, 1953 |
| 2,660,443 | Miller | Nov. 24, 1953 |

FOREIGN PATENTS

| | | |
|---|---|---|
| 496,549 | Great Britain | Nov. 28, 1938 |